United States Patent
Lai

(12) 
(10) Patent No.: US 6,269,259 B1
(45) Date of Patent: Jul. 31, 2001

(54) RECEIVER SET FOR DESKTOP AND MOBILE PHONES

(76) Inventor: Sun-Long Lai, 2nd Floor, No. 47, Chung Hua Road, Sec. 1, Taipei City (TW)

( * ) Notice: Subject to any disclaimer, the term of this patent is extended or adjusted under 35 U.S.C. 154(b) by 0 days.

(21) Appl. No.: 09/309,542

(22) Filed: May 11, 1999

(51) Int. Cl.[7] .................................................. H04B 1/38
(52) U.S. Cl. ........................... 455/569; 455/90; 455/568; 455/575
(58) Field of Search .............................. 455/11.1, 90, 550, 455/568, 569, 575; 379/420, 430, 433; 381/370, 375, 376, 381

(56) References Cited

U.S. PATENT DOCUMENTS

| | | | |
|---|---|---|---|
| 5,724,667 | * 3/1998 | Furuno ................................ | 455/569 |
| 5,943,627 | * 8/1999 | Kim et al. ............................ | 455/569 |
| 5,983,100 | * 11/1999 | Johansson et al. .................. | 455/568 |
| 5,991,637 | * 11/1999 | Mack, II et al. ..................... | 455/569 |
| 5,991,645 | * 11/1999 | Yuen et al. ........................... | 455/568 |
| 6,085,112 | * 7/2000 | Kleinschmidt et al. ............. | 455/566 |
| 6,101,402 | * 8/2000 | Bartha et al. ........................ | 455/569 |

* cited by examiner

*Primary Examiner*—Nay Maung
(74) *Attorney, Agent, or Firm*—Thomas Schneck

(57) ABSTRACT

A receiver set for desktop and mobile phones, removable from a handset or a mobile phone set, includes an extendable ear hook and an extendable speaker element. While extending the ear hook and the speaker element, the receiver set can be used as an earphone. Therefore, during operation of the receiver set, user's both hands can be free for handling other tasks. While storing the receiver set onto the handset or the mobile phone with both the ear hook and the speaker element retrieved, the receiver set can perform as a conventional receiver. It is obvious that the receiver set of the present invention provides more flexibility in using a phone.

1 Claim, 4 Drawing Sheets

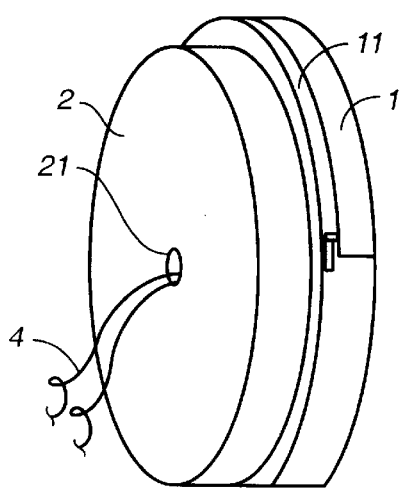
FIG._1A
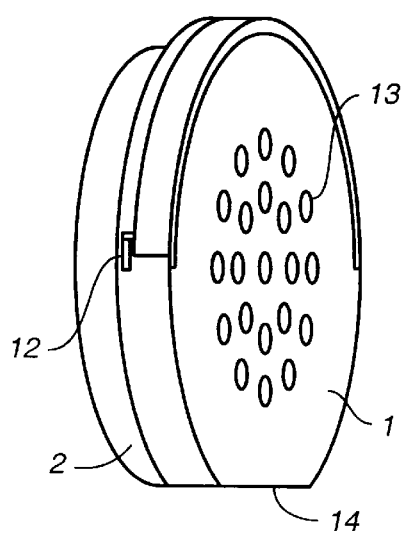
FIG._1B
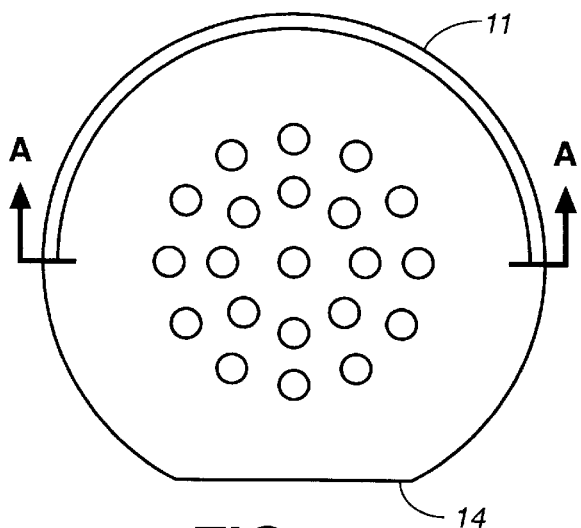
FIG._2A
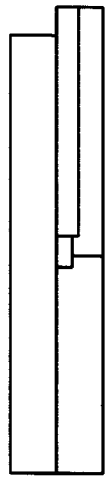
FIG._2B
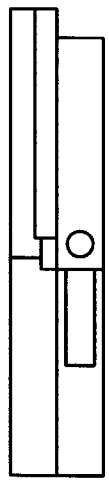
FIG._2C
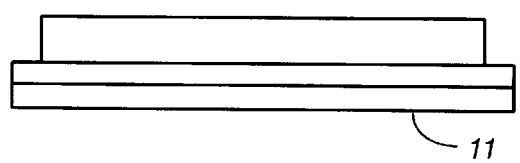
FIG._2D
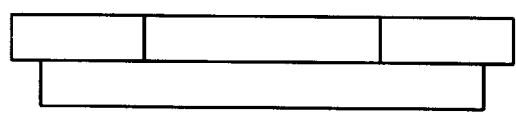
FIG._2E

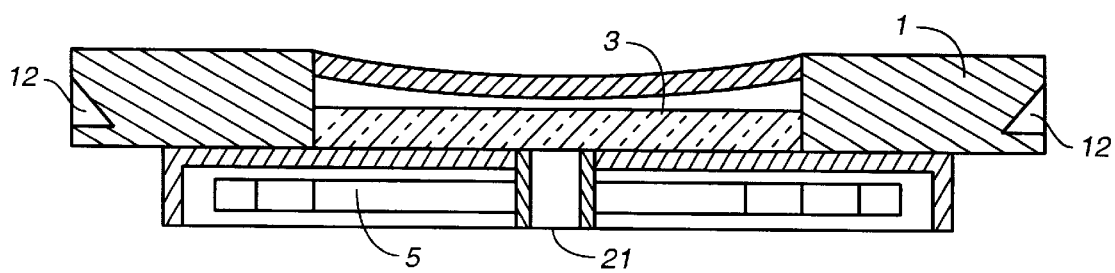
FIG._4
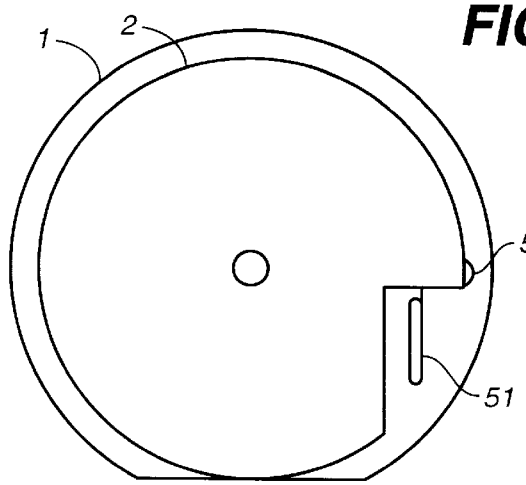
FIG._3
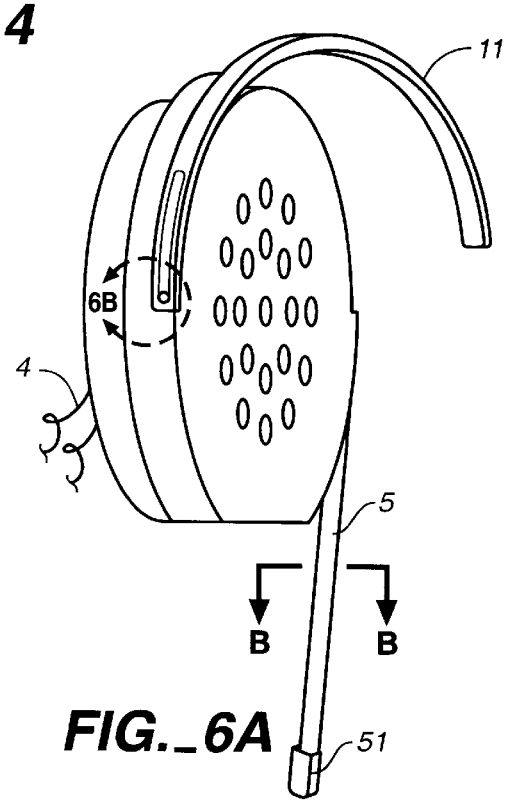
FIG._6A
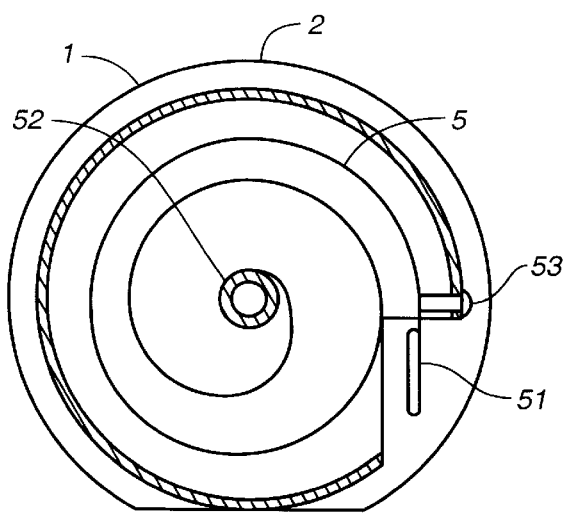
FIG._5
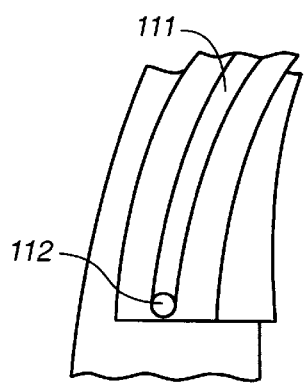
FIG._6B
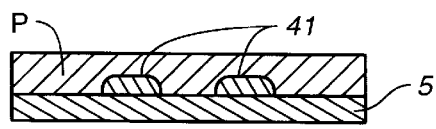
FIG._6-1

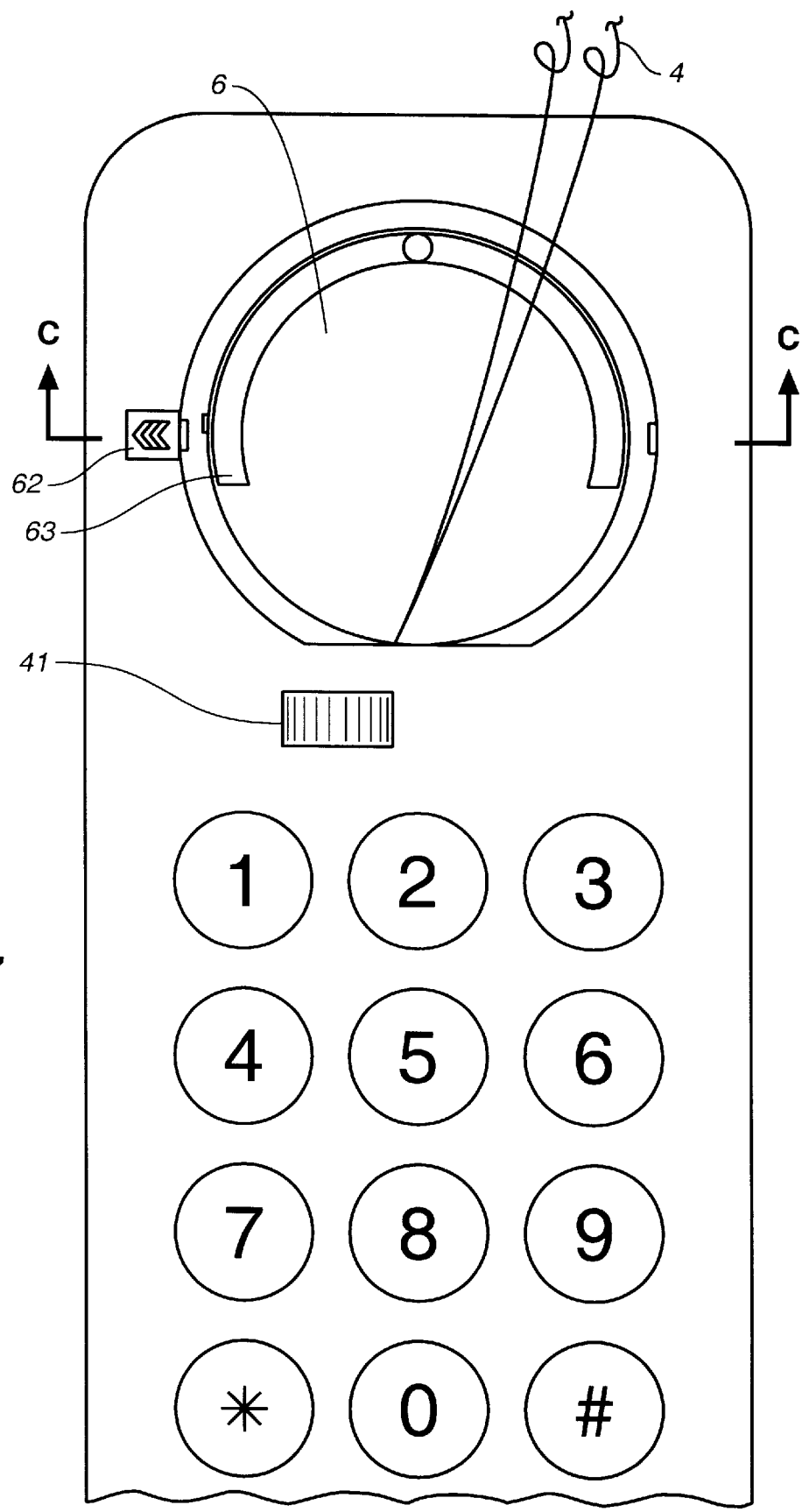
FIG._7

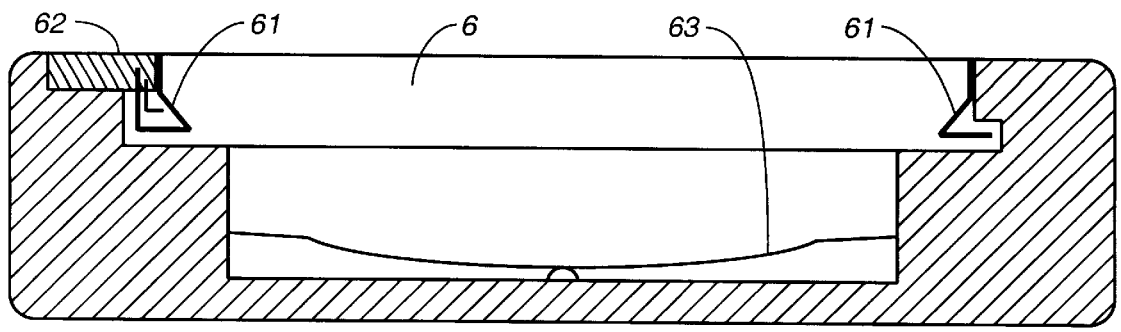
FIG._8
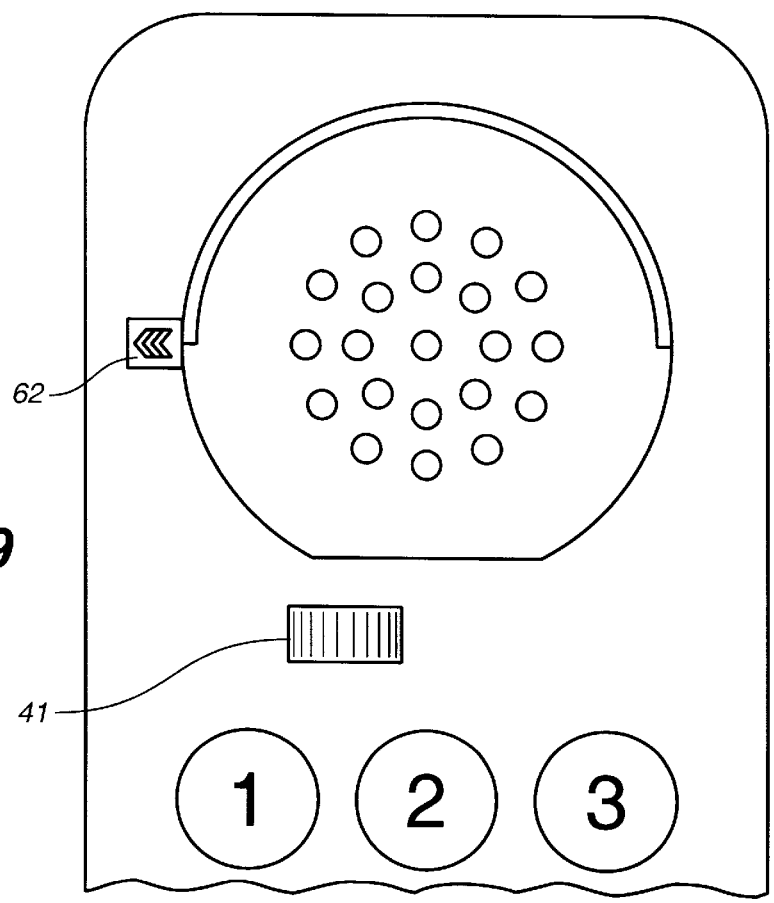
FIG._9

RECEIVER SET FOR DESKTOP AND MOBILE PHONES

BACKGROUND OF THE INVENTION (1) Field of the Invention

The invention relates to a receiver set for desktop and mobile phones, and more particularly to a receiver set which can be removed from a handset or a mobile phone set to perform as a conventional earphone.

(2) Description of the Prior Art

A telephone set, either a convention-style phone or a cordless mobile phone, generally has a speaker and a receiver to be integrated into a handset. While using the handset of a telephone to communicate with another party, a user needs to move the speaker toward the mouth and to adjust the receiver close to the ear. Though such type of the conventional handsets including the speaker at one end and a receiver at another end are widely accepted for desktop phones and mobile phones, yet it is still inconvenient to those who need to use both hands on another tasks while phoning. Aforesaid tasks include driving, typewriting, computer key-in, and so on. To improve the conventional handset, some prior art proposed to add an accessory to the back of the receiver end for resting the handset upon user's shoulder so as to free both hands from gripping. Such an improved handset is usually seen in a modem office. However, the improved handset generally has two major disadvantages as follows:

1. The user needs to slant his head and raise his shoulder so that the handset can be firmly held in between. However, such holding will restrict mobility of the user, and the phoning time may not be prolonged.
2. The improved handset can't be applied to most mobile phones, which have compact bodies.

Another improvement on the conventional handset relates to a headset with a earphone and a microphone. Such a headset, which is usually used by an operator and/or a professional in broadcasting fields, provides its user with the talking convenience and with both hands free from gripping. However, the headset is suitable only to professionals, not to ordinary people in an office. It is obvious that wearing the headset all day long will definitely hinder the ordinary tasks and thus can't be accepted by most people anyway.

SUMMARY OF THE INVENTION

Accordingly, to improve aforesaid disadvantages of the conventional handsets or headsets, the present invention assigns a removable receiver set to the conventional or mobile phone set. The receiver set includes an extendable ear hook and an extendable microphone. While preparing the receiver set for application, the user may take the receiver, pull out the ear hook, hang the ear hook to user's ear, and then pull out the microphone for talking. While storing the receiver set, the user may pull back the ear hook and the microphone, and reposition them back to the handset or the mobile phone set as an ordinary receiver set. By providing the receiver set of the present invention, disadvantages of the conventional phone sets or the mobile phones can be waived.

BRIEF DESCRIPTION OF THE DRAWINGS

The present invention will now be specified with reference to its preferred embodiments illustrated in the drawings, in which FIG. 1A is a schematic view of an embodiment of the receiver set in accordance with the present invention, showing the receiver at a first angle;

FIG. 1B is the receiver set of FIG. 1A, showing the receiver at a second angle;

FIG. 2A is an engineering presentation drawing of a first view of the receiver set of FIGS. 1A, 1B;

FIG. 2B is an engineering presentation drawing of a second view of the receiver set of FIGS. 1A, 1B;

FIG. 2C is an engineering presentation drawing of a third view of the receiver set of FIGS. 1A, 1B;

FIG. 2D is an engineering presentation drawing of a fourth view of the receiver set of FIGS. 1A, 1B;

FIG. 2E is an engineering presentation drawing of a fifth view of the receiver set of FIGS. 1A, 1B;

FIG. 3 is a bottom view of the receiver set of FIG. 1;

FIG. 4 is a cross-sectional view of the receiver set of FIG. 2, along line A—A, together with an enlarged drawing;

FIG. 5 is a bottom view of the receiver set of FIG. 1, with the bottom plate removed;

FIG. 6A shows a schematic drawing for the receiver set in accordance with the present invention, with both the ear hook and the microphone extended;

FIG. 6B is an enlarged view of FIG. 6A;

FIG. 6-1 is a cross-sectional view of the receiver set of FIG. 6 along line B—B;

FIG. 7 is a front view of a handset of a telephone set, with a receiver removed;

FIG. 8 is a cross-sectional view of the handset of FIG. 7 along line C—C; and

FIG. 9 is a front view of the handset of FIG. 7, with the receiver in place.

DESCRIPTION OF THE PREFERRED EMBODIMENT

The invention disclosed herein is directed to a receiver set for desktop and mobile phones. In the following description, details are set forth in order to provide a thorough understanding of the present invention. It will be appreciated by one skilled in the art that variations of these specific details are possible while still achieving the results of the present invention. In other instances, well-known components are not described in detail in order not to unnecessarily obscure the present invention.

Referring now to FIG. 1A, FIG. 1B, two viewing angles have been used to illustrate the configuration of the receiver set according to the present invention. At the right part of FIG. 1A, FIG. 1B, a top portion 1 of the receiver is clearly illustrated. At the left part of FIG. 1A, FIG. 1B, a bottom portion 2 of the receiver can be viewed clearly. The top portion 1 and the bottom portion 2 are rigidly connected, and the top portion 1 has a larger surface area. At one lower lateral end of the receiver between the top portion 1 and the bottom portion 2, a flat end 14 is defined for providing a specific angle to install the receiver. At one upper rim of the top portion 1, an extendable ear hook 11 is included. While the ear hook 11 being at a storage status, the ear hook 11 is flush with the top portion 1 and can be part of the upper rim. The top portion 1 also includes a plurality of sound holes 13 for allowing the speaking through the top portion 1 and into interior of the receiver. The bottom portion 2 includes a central hole 21 for allowing cables 4 of the receiver to penetrate therethrough.

Refer now to FIGS. 2A–2E to FIG. 4. In FIGS. 2A–2E, an engineering representation drawing is shown to provide a top view, a front view, a rear view, a left-side view and a right-side view of the receiver set of the present invention.

In FIG. 3, a bottom view of the receiver set is shown. In FIG. 4, a cross-sectional view of the receiver along line A—A is shown. As shown, the top portion 1 has a pair of spring notches 12 located at the opposing ends of rim of the top portion 1. While repositioning the receiver set of the present invention back to a storage bowl 6 (see FIG. 8) on a handset or a mobile phone set, the spring hooks 61 (see FIG. 8) in the storage bowl 6 will automatically engage with the respective spring notches 12. Thus, the receiver set can be fixedly anchored in the storage bowl 6, and the combination of the handset or the mobile phone set and the receiver set of the present invention will act as an ordinary handset or an ordinary mobile phone set. In FIG. 4 and the enlarged drawing thereof, the top portion 1 of the receiver set can include a disk-like receiving body 3 located inside the central part of the top portion 1. The receiving body 3 can be connected with the cables 4, and further the cables 4 provide the connection to built-in wiring on the handset or the mobile phone set. The bottom portion 2 can include a speaker reed 5 thereinside, in which the speaker reed 5 is wound and extendable. At one end of the speaker reed 5, a speaker element 51 is installed. By providing the wound and extendable reed 5, the speaker element 51 thus can be extendable.

Referring now to FIG. 5, the bottom portion 2 is shown with the bottom plate removed. As shown, the speaker reed 5 can be a thin slender steel plate (see FIG. 6-1), with one end having the speaker element 51 and with another end fixed to a short pillar-like center shaft 52. The speaker reed 5 is wound and extendable so that the speaker element 51 can be pulled out while in use (see FIGS. 6A, 6B). By adjusting the speaker element 51 close to user's mouth, the user can use the speaker element 51 as a microphone.

While storing the protruding speaker element 51, the user may depress a pin 53 as shown to retrieve automatically the speaker reed 5 back to a wound state.

FIG. 6A, FIG. 6B illustrates a state of the receiver set being used as an earphone in accordance with the present invention. As shown, the ear hook 11 includes a slot 111 extended along the longitudinal direction at a left portion of the ear hook 11. A short pillar 112 raising from rim of the top portion 1 is included to engage with the slot 111 for performing as a sliding mechanism. By providing the slot 111 and the short pillar 112 in the slot 111, the ear hook 11 can be pulled back and forth without separation from the top portion 1. Also, one free end of the ear hook 11 can be swung away to form an angle with the top portion 1 by pivoting around the short pillar 112 at another end of the ear hook 11 having the slot 111. In the present invention, the ear hook 11 is made of curved elastic steel, so that a hook profile can be formed for the ear hook 11 at a pullout state. While using the receiver set, the user may hang the ear hook 11 to one of the user's ears and pull out the sending element 51 of the sender 50 close to the user's mouth, then a complete earphone set can be established. While storing the receiver set, the user may pull back the ear hook 11 and reposition it upon the top portion 1 of the receiver set, depress the pin 53 to retrieve the sending element 53, then the receiver set can be anchored to the handset or the mobile phone set.

FIG. 6-1 shows a cross-section of the speaker reed 5 along line B—B of FIG. 6A. The speaker reed 5 of the present invention can be a two-layer structure with a steel layer S and an insulation layer P, and a pair of wires 41 are provided between the steel layer S and the insulation layer P.

FIG. 7 shows a handset (or a mobile phone set) with the receiver set removed. FIG. 8 is a cross-sectional view of the handset of FIG. 7 along line C—C. As shown, the storage bowl 6 for receiving the receiver set of the present invention includes a curved spring 63 located at a bottom of the storage bowl 6. At opposing lateral internal sides of the storage bowl 6, a pair of spring hooks 61 are included for engaging with the respective pair of spring notches 12 (see FIG. 4) on the receiver set. While placing the receiver set onto the storage bowl 6, the spring notch 12 will engage automatically with the respective spring hook 61 for firmly anchoring the receiver set onto the storage bowl 6. FIG. 9 shows the state of aforesaid engagement. Also, at this state, the curved spring 63 is pressed down against a lower surface of the bottom portion 2 of the receiver set. While removing the receiver set from the handset, the user may depress a shift button 62 outward to retrieve the spring hooks 61 from the respective spring notches 12, the curved spring 63 will push the receiver set upward, and then the receiver set can be easily taken away. According to the present invention, the cables 4 are provided to establish the connection between the receiver set and the handset (or the mobile phone set). Also, the cables 4 can be extendable, and can cooperate with a wire-retrieval button 41. Yet the combination of the extendable cables 4 and the wire-retrieval button 41 is well-known in the art, so no effort will be devoted to describing such a conventional structure.

In accordance with the present invention, the receiver set is removable and can perform as an earphone while removed. During the operation of the receiver set, both hands can be free for other tasks. During the storage of the receiver set, the handset with the receiver set can be operated as an conventional handset. That is, the receiver set of the present invention has obvious advantages in operation, storage, and carrying.

While the present invention has been particularly shown and described with reference to preferred embodiments, it will be understood by those skilled in the art that various changes in form and detail may be without departing from the spirit and scope of the present invention.

I claim:

1. A receiver set for desktop and mobile phones, comprising a top portion for receiving and a bottom portion for speaking, engageable with a handset or a mobile phone set; the top portion including a pair of spring notches at opposing lateral sides thereof and an extendable ear hook located along a rim thereof; the ear hook, for hanging to a ear while being pulled out, having a longitudinal slot at one end thereof for sliding against a short pillar at the rim of the top portion, and having another end thereof free; the bottom portion having an extendable speaker reed wound thereinside and made of a steel layer and an insulation layer, the speaker reed having wires located between the steel layer and the insulation layer and having a speaker element at one end thereof; while pulling the ear hook and the speaker element, the receiver set performing as an earphone; and while storing the receiver set onto a storage bowl at the handset or the mobile phone set, the receiver set performing as a conventional receiver.

* * * * *